JACK WOOD.
Improvement in Cultivators.
No. 125,872.  Patented April 16, 1872.
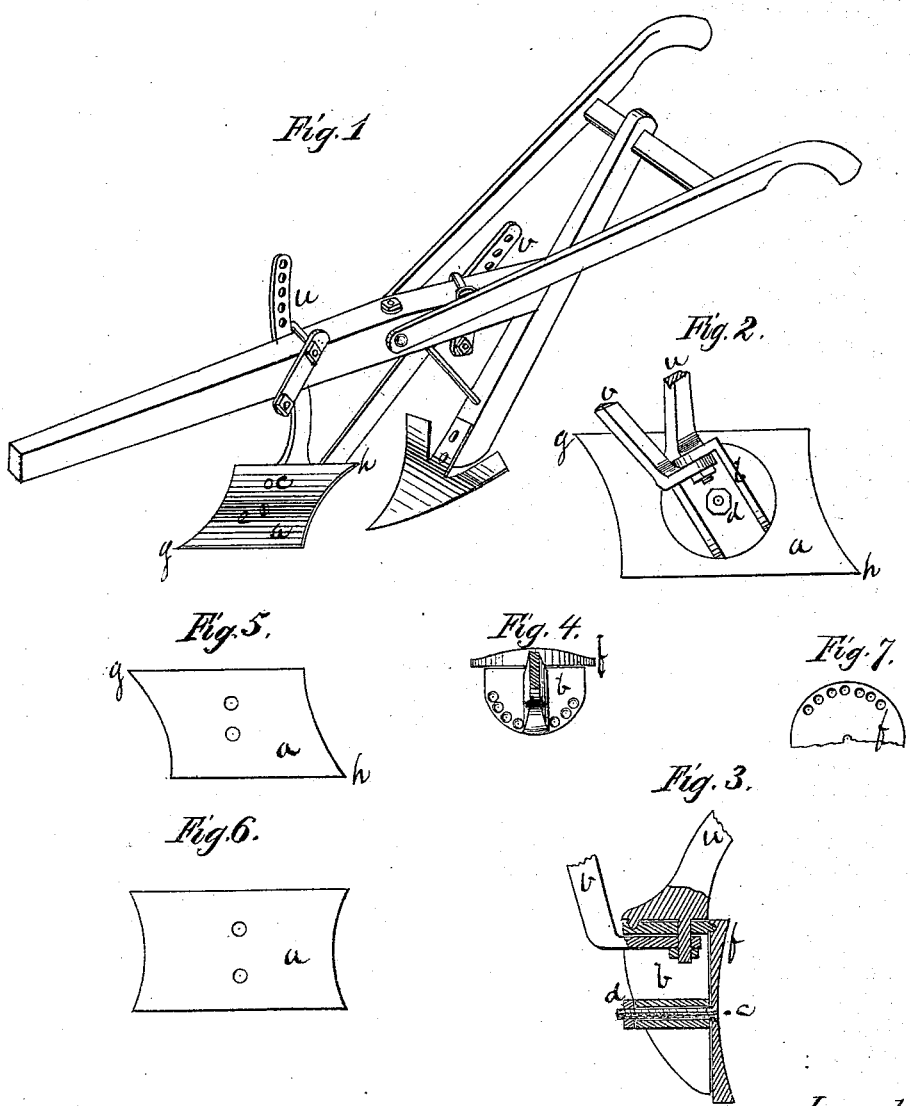
Witnesses.
Thos. P. Everett
Robert Everett.
Inventor.
Jack Wood 125,872

UNITED STATES PATENT OFFICE.

JACK WOOD, OF WEDOWEE, ALABAMA.

IMPROVEMENT IN CULTIVATORS.

Specification forming part of Letters Patent No. 125,872, dated April 16, 1872.

Specification describing certain Improvements on Corn and Cotton Scrapers, invented by JACK WOOD, of Wedowee, in the county of Randolph and State of Alabama.

This invention is more especially intended for use in the cultivation of cotton, but can be used advantageously in the cultivation of corn and other crops. It can be attached to sweeps or to turning-plows, and may be placed so as to be front-acting, or acting on the right or the left line of the sweep. One scraper only can be used, or two, the one being in front of the other, and placed in opposite or reversed positions.

The drawing hereof shows, by Figure 1, a perspective view of a sweep with a scraper attached thereto. Fig. 2 is a back view of the scraper with the adjusting devices; Fig. 3, a view by longitudinal section of the means for adjusting; Fig. 4, a top view of part of the adjusting devices; Figs. 5 and 6, views of scrapers detached; and Fig. 7, a view of the upper portion of the inner surface of the washer.

As certain parts of the sweep here shown are in common use, I will limit this description to those parts which are more particularly connected with my improvement.

To the ordinary adjustable arms $u$ and $v$ there is attached a foot, $b$, a bolt from $u$, held by a nut passing through the upper end of the foot and the lower and bent end of $v$. A portion of the upper surface of the foot $b$, as shown by Fig. 4, is recessed for a pin from the bottom end of arm $u$, the pin being shown in Fig. 3. By these means the scraper can be adjusted to any desired angle, the nut of the arm $u$ being unscrewed to allow the pin to be moved from one recess to another.

The scraper $a$ is attached to the foot $b$ by a bolt, $e$, and nut $d$, there being interposed between the scraper and foot a washer, $f$. A screw, $c$, passes through the scraper into the washer. This washer is shown solid, but may be of skeleton form. A portion of the inner upper surface of this washer is recessed, as is shown by Fig. 7, which is a view of the inner surface of the upper half of the washer. A pin of the foot $b$ fits into one of these recesses, as is indicated by Fig. 3. By unscrewing the nut $d$ the washer may be moved, and the pin moved from one recess to another, and thus the scraper be further adjusted, the point being raised or lowered, as may be desired. The right and left hand scrapers, shown by Figs. 1, 2, and 5, have two points, $g$ and $h$. The scraper shown by Fig. 6, as will readily be seen, has four points. The reversal of the position of the scraper will, therefore, substitute the upper point of the two pointed scrapers for the lower, while the scraper of Fig. 6 will, in addition to this, also allow of its use as a right or left hand scraper.

In cultivating cotton by attaching the scraper on the left or land-side of turning-plows, the scraper moving nearer the cotton-line by four or five inches than the plow, the surface of the earth will be carried to the wing of the turner, and the turner cutting deeper and just behind the scraper, all the weeds and grass will be covered in the "balk." After the cotton-row is chopped or hoed the first time, the sweep is the implement used. By attaching the scraper in front of the sweep, on the side next to the crop, the fouling and obstructing material, such as clods, stones, &c., are moved to the outer wing of the sweep, and thrown into the "balk."

Without the scraper the most of the grass that is dislodged by the hoe from the cotton-row will be thrown by the sweep into the cotton-row again, and again will have to be removed by the hoe, especially in rainy weather, when grass cannot be killed with the hoe. When the grass has been once moved four inches from the cotton-line by the use of this scraper, it can be kept out of the cotton-line during the cultivation of the crop.

When the "balks" have been plowed the earth slopes each way from the crop, causing a constant strain on the plowman to hold the sweep to the crop. The attachment of this scraper not only moves the foul material to the "balk," but counteracts the slope of the ridge, enabling the plowman to hold the sweep to the crop with as much ease as though the ground was level.

What I claim is—

The foot $b$, constructed with the perforations on the upper side to give the lateral adjustment, and the washer $f$, with the perforations on the back to give the circular adjustment, connected to the arms or standards $u$ and $v$, and operating substantially as recited.

This specification signed this 1st day of March, 1872.

JACK WOOD.

Witnesses:
 THOS. T. EVERETT,
 ROBERT EVERETT.